United States Patent
de Lescure

(10) Patent No.: US 10,268,794 B2
(45) Date of Patent: Apr. 23, 2019

(54) EDITING A NOC TOPOLOGY ON TOP OF A FLOORPLAN

(71) Applicant: Arteris, Inc., Campbell, CA (US)

(72) Inventor: Benoit de Lescure, Berkeley, CA (US)

(73) Assignee: ARTERIS, Inc., Campbell, CA (US)

( * ) Notice: Subject to any disclaimer, the term of this patent is extended or adjusted under 35 U.S.C. 154(b) by 0 days.

(21) Appl. No.: 15/936,350

(22) Filed: Mar. 26, 2018

(65) Prior Publication Data

US 2018/0218105 A1 Aug. 2, 2018

Related U.S. Application Data

(63) Continuation of application No. 14/975,844, filed on Dec. 20, 2015, now Pat. No. 9,940,423.

(51) Int. Cl.
*G06F 17/50* (2006.01)

(52) U.S. Cl.
CPC ...... *G06F 17/5072* (2013.01); *G06F 17/5077* (2013.01); *G06F 17/5081* (2013.01)

(58) Field of Classification Search
CPC .......................... G06F 17/5072; G06F 17/5077
USPC .......................................................... 716/102
See application file for complete search history.

(56) References Cited

U.S. PATENT DOCUMENTS

| | | | | |
|---|---|---|---|---|
| 2012/0311512 A1* | 12/2012 | Michel | ................ | G06F 17/5031 716/104 |
| 2014/0115218 A1* | 4/2014 | Philip | ................ | G06F 17/5072 710/305 |

* cited by examiner

*Primary Examiner* — Suchin Parihar
(74) *Attorney, Agent, or Firm* — Dana Legal Services

(57) ABSTRACT

A NoC topology is represented on top of a physical view of a chip's floorplan. The NoC topology is edited, such as by adding switches, removing switches, and adding and removing switches on routes. An initial location of switches within the floorplan is automatically computed. Locations can also be edited by a user. Statistical metrics are calculated, including wire length, switch area, NoC area, and maximum signal propagation delay for logic in each of multiple clock domains. Wire density can also be overlaid on chip's floorplan on the display. The NoC topology is represented by a data structure indicating connections between initiator and target endpoints with ordered lists of switches in between. The data structures are written and read from memory or a non-transient computer readable medium. The locations of endpoint and switches are also written out, as scripts for place & route tools.

20 Claims, 22 Drawing Sheets

```
Connections:
IA - TX
IA - TY
IA - TZ
IA - TQ
IB - TX
IB - TY
IC - TX
IC - TY
IC - TZ
IC - TQ
ID - TX
ID - TY
ID - TZ
IE - TY
IE - TZ
IF - TX
IF - TZ
IF - TQ
IG - TY
IG - TZ
IG - TQ
```

FIG. 10

```
Routes:
IA - S0 - S4 - TX
IA - S0 - S4 - S7 - TY
IA - S0 - S4 - S7 - TZ
IA - S0 - S4 - S7 - TQ
IB - S0 - S4 - TX
IB - S0 - S4 - S7 - TY
IC - S1 - S4 - TX
IC - S1 - S4 - S7 - TY
IC - S1 - S6 - S7 - TZ
IC - S1 - S6 - S7 - TQ
ID - S1 - S4 - TX
ID - S1 - S4 - S7 - TY
ID - S1 - S6 - S7 - TZ
IE - S1 - S4 - S7 - TY
IE - S2 - S5 - S7 - TZ
IF - S2 - S4 - TX
IF - S6 - S7 - TZ
IF - S6 - S7 - TQ
IG - S3 - S6 - s7 - TY
IG - S3 - S6 - s7 - TZ
IG - S3 - S6 - s7 - TQ
```

FIG. 11

```
Routes:
IA - S0 - S4 - TX
IA - S0 - S4 - S7 - TY
IA - S0 - S4 - S7 - TZ
IA - S0 - S4 - S7 - TQ
IB - S0 - S4 - TX
IB - S0 - S4 - S7 - TY
IC - S1 - S4 - TX
IC - S1 - S4 - S7 - TY
IC - S1 - S6 - S7 - TZ
IC - S1 - S6 - S7 - TQ
ID - S1 - S4 - TX
ID - S1 - S4 - S7 - TY
ID - S1 - S6 - S7 - TZ
IE - S1 - S4 - S7 - TY
IE - S2 - S5 - S7 - TZ
IF - S8 - S4 - TX
IF - S6 - S7 - TZ
IF - S6 - S7 - TQ
IG - S3 - S6 - s7 - TY
IG - S3 - S6 - s7 - TZ
IG - S3 - S6 - s7 - TQ
```

FIG. 18

EDITING A NOC TOPOLOGY ON TOP OF A FLOORPLAN

FIELD OF THE INVENTION

The invention is in the field of chip design, and specifically regarding the design of network-on-chip architecture topologies.

BACKGROUND

The designers of chips connect cores, which comprise logic cells. Certain software, for chip design, displays chip floorplans. Floorplans define various physical regions, in which the logic cells of certain cores can be placed and blockages where no logic cells can be placed.

Cores have standard interfaces. A network-on-chip (NoC) is an efficient and widely used mechanism for connecting cores. A NoC connects cores through their interfaces, and allows the cores to communicate with each other. A NoC includes logic cells, which are placed throughout the floorplan, and wires, which are routed throughout the floorplan.

A NoC is a network, including connected elements. Some such elements are network interface units, switches, pipeline stages, data width converters, clock domain adapters, power domain adapters, firewalls, and probes. Each element has an approximate physical location within the floorplan.

A NoC connects elements to one another in a network. The organization of connections between elements is the NoC topology.

It is difficult to determine the best NoC topology without a view of the floorplan and how the NoC fits into the floorplan. One conventional approach is to organize the NoC topology based on quality-of-service requirements of cores. For example, one might connect low memory latency cores closest to a memory interface core. Another conventional approach is to group cores based on function. For example, one might group video encoding and decoding cores within the NoC topology. Another conventional approach is to minimize the importance of the spatial distribution of the elements of the NoC within the floorplan by placing the NoC entirely within a central portion of the chip.

Conventional approaches suffice for chips with small numbers of core and simple floorplans. However, chips include increasingly many cores and have correspondingly complex floorplans. What is needed is a method and system to design a NoC topology within the physical constraints of a floorplan.

SUMMARY OF THE INVENTION

The invention is directed to a method and system of representing a NoC topology on top of a physical view of a chip and editing the NoC topology. Some embodiments, based on the various aspects of the invention, allow for an alternative representation of the NoC topology without the physical view. Some embodiments, based on the various aspects of the invention, also allow editing the NoC topology on top of the physical view. A simple form of editing is to add elements to routes. Some steps of advanced editing, based on the various aspects of the invention, entail removing elements from a set of shared routes and reordering elements within a set of routes.

In accordance with various aspects, some embodiments of the invention provide for editing the physical locations of NoC topology elements. In accordance with some aspects of the invention, some embodiments provide for automatically suggesting physical locations for a number of NoC topology elements. In accordance with some aspects of the invention, some embodiments provide for exporting a script for a place and route (P&R) tool to constrain the physical location of elements.

In accordance with some aspects of the invention, some embodiments of the invention provide for the physical view to comprise blockages. Lines indicate connections between elements within the NoC topology. According to some embodiments, the lines follow Manhattan routes, and do so such that no line crosses a blockage.

In accordance with some aspects of the invention, some embodiments of the invention are reentrant. A practitioner can use the invention in multiple sessions. The result of one session provides an initial state for a second session. One reentrant embodiment provides for saving the physical view, physical locations, and NoC topology information to a file at one time and then reading it from the file later.

In accordance with some aspects of the invention, some embodiments of the invention calculate metrics. Some metrics encompassed by various embodiments include wire length, area, wire density, distance-based timing, bandwidth, and transaction latency at endpoints.

The invention is directed to concrete methods and system that may be implemented using a computer. Such methods are performed by one or more computers executing code stored on one or more non-transitory computer-readable media.

BRIEF DESCRIPTION OF THE DRAWINGS

FIG. 10 illustrates a list of connections between initiators and targets.

FIG. 11 illustrates a list of routes through switches between initiators and targets.

FIG. 18 illustrates a modified list of routes through switches between initiators and targets.

DETAILED DESCRIPTION

Figure 1:
FIG. 1 illustrates a table of connectivity between initiators and targets of a NoC.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates, which may need to be independently confirmed.

The invention is a way to design a NoC topology within the physical constraints of a floorplan that makes it easier and quicker to make optimizations, and reduces the risk of design errors.

In accordance with various aspects of the invention, some embodiments of the invention describe the topology of a NoC as a set of network elements and set of routes. Each route is an ordered list of elements that traffic traverses to get from one source endpoint to one destination endpoint. Network interface elements are endpoints.

In accordance with various aspects of the invention, some embodiments of the invention describe the topology of a NoC as a set of router elements, each having connectivity to one or more other routers. Routers can include endpoints, and connections between routers can include other network elements.

Every network element provides for a certain level of data throughput, known as a bandwidth. For network elements connected to more than two other elements, available bandwidth is a property of each connection. Maximum bandwidth is a function of clock speed (for synchronous logic) and bus width. The bus width determines the number of wires physically connected between elements.

Initiators are a type of endpoint that is a source of requests and a destination of responses. Target endpoints are a destination of requests and source of responses. NoCs can facilitate transactions, as requested by initiators, and those transactions require at least one request and at least one corresponding response. The time from when an initiator issues a transaction request to the NoC until the NoC issues a response to the initiator, known as a latency, is a property of each requested transaction. Those interested in performance often analyze latency statistically or algorithmically for give traffic patterns, but the NoC topology sets a minimum latency for each route.

In accordance with various aspects of the invention, some embodiments of the invention use computer software to read the physical constraints of a chip floorplan, read a description of a NoC topology, and renders them in a combined arrangement on a display.

The physical constraints define the locations of NoC endpoints and the areas of the chip where the NoC logic can exist. Some embodiments guide the placement of some NoC elements, restrict placement of some, or both. For example, some embodiments limiting all elements of a particular power domain to a particular polygon-shaped bounding box in which P&R can easily insert the necessary power nets.

A graphical view and feedback is a fast and easy way to understand and modify a NoC topology and a floorplan. In accordance with various aspects of the invention, some embodiments employ a computer program with a graphical user interface (GUI). The GUI displays a layout of NoC elements and their connections as one or more layers on top of a physical view. In accordance with various aspects of the invention, some embodiments constrain the location of elements and in some embodiments their connections, according to the floorplan.

In accordance with various aspects of the invention, some embodiments begin by reading a NoC topology description and a floorplan description and creating an initial layout for the NoC elements. That step need not be optimal, and ideally is fast. Various algorithms are suitable, such as a simple set of heuristics that minimizes wire length between NoC elements. The initial layout may be displayed.

After the initial layout creation, a NoC designer can edit the NoC topology interactively. Some types of topology edits possible with various embodiments include creating elements, deleting elements, and modifying routes. According to some embodiments, editing routes automatically causes the creation or deletion of elements.

In accordance with various aspects of the invention, in some embodiments the NoC designer can also edit the physical layout. Some types of physical layout edits possible with various embodiments include changing the placement of NoC elements, such as endpoints, and changing physical constraints such as polygon shapes and sizes.

According to some aspects and embodiments, after editing, the designer saves the NoC topology, endpoint locations, physical constraints, or a combination of those. Computer-based implementations may save to a local or remote non-transient computer readable medium.

In accordance with various aspects of the invention, some embodiments perform analysis of the NoC topology and floorplan. Analysis can include computing statistics, such as total wire length, element area, wire density, and path timing. Some embodiments perform analysis when requested by a user. Some embodiments perform analysis automatically, but approximately, during an editing session to give immediate feedback to the designer regarding the consequences of their edits on the performance and ability to implement, physically, a chosen NoC topology.

In accordance with various aspects of the invention and in some embodiments, the simultaneous representation of the NoC topology and physical view of a chip is in one layer. In other embodiments, it is in multiple layers. Information from one layer overlays information from another layer. Different embodiments represent layers differently and in different orders. The present disclosure describes the relationship as the NoC topology being on top of the physical view.

The representation of the NoC topology on top of the floorplan view may be visual, or non-visual. One non-visual representation would be as a textual list of coordinates.

Though the term "view" describes the representation of the physical floorplan, the scope of the invention is not limited to visual representations.

According to some aspects and embodiments, FIG. 1 shows connectivity table 100. Connectivity table 100 indicates the ability for data communication between seven initiators (IA, IB, IC, ID, IE, IF, and IG), each represented with a row, and four targets (TX, TY, TZ, TQ), each represented by a column. Tick marks indicate initiator-target pairs with connectivity.

Figure 2:
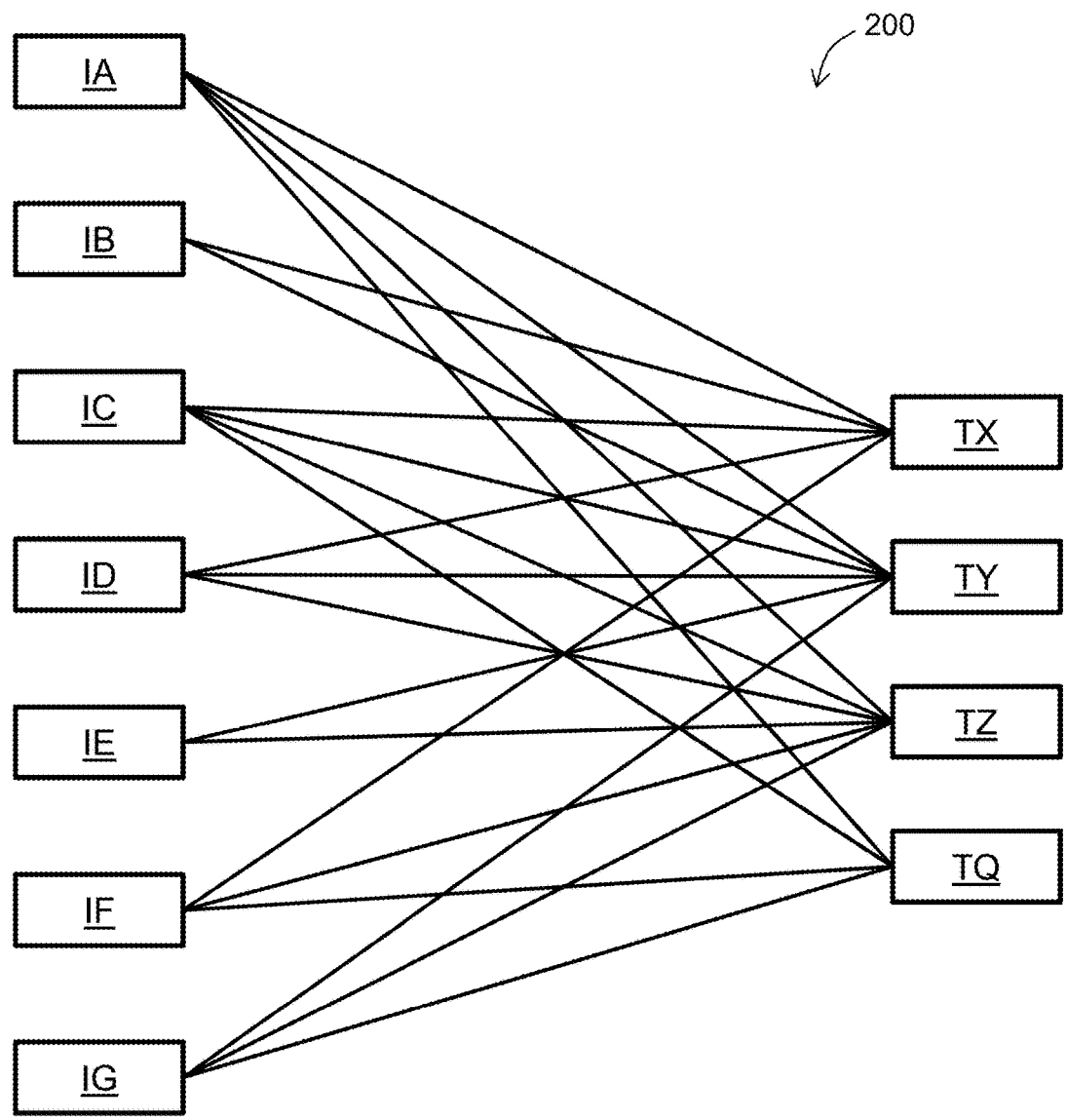
FIG. 2 illustrates a diagram of connectivity between initiators and targets of the NoC shown in the table of FIG. 1.

FIG. 2 shows connectivity 200, of a NoC, diagrammatically and in accordance with some aspects of the invention. Initiators are on the left and targets are on the right. The connectivity 200 matches that of the connectivity table 100, with lines indicating connections between initiators and targets.

Figure 3:
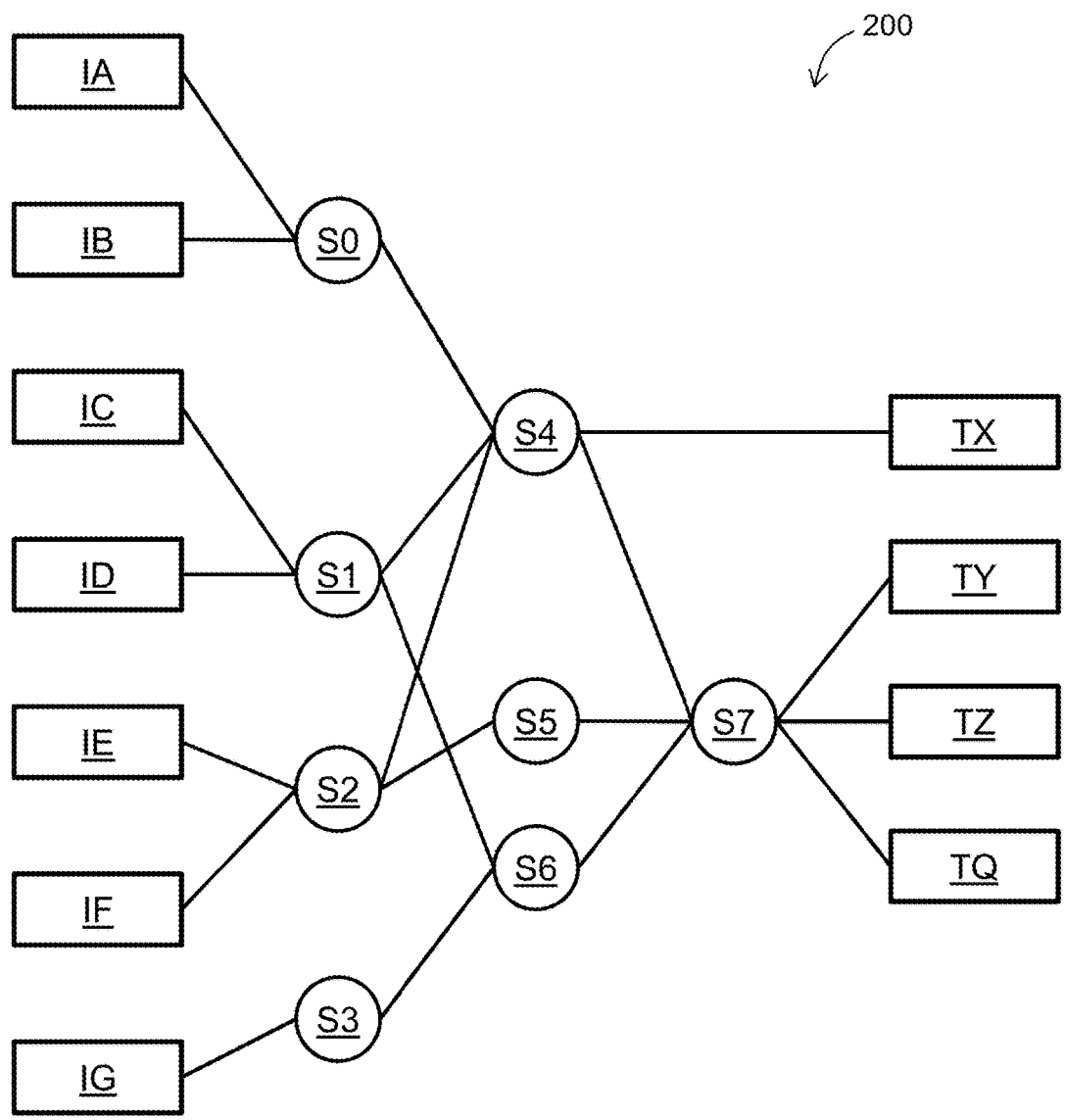
FIG. 3 illustrates a topology of initiator and target endpoints and intermediate switches for the NoC of FIG. 2.

Referring now to FIG. 1, FIG. 2 and FIG. 3 collectively, FIG. 3 shows a topology diagram for the connectivity 200 of FIG. 2, in accordance with some aspects and embodiments of the invention. The topology diagram includes seven switches (S0, S1, S2, S3, S4, S5, S6, and S7) that provide various routes between initiators and targets, in accordance with some aspects of the invention. Sequences of connections through switches enable the full connectivity of initiator-target pairs as shown in table 100 of FIG. 1.

Figure 4:
FIG. 4 illustrates a chip floorplan showing blockages and the locations of initiator and target endpoints.

FIG. 4 shows a chip floorplan 400. It includes blockages that represent spaces where P&R may not place the logic and wires of a NoC. Dots represent the locations of initiators and targets interfaces to the NoC. The chip floorplan 400 shows a dot for each initiator interface (IA, IB, IC, ID, IE, IF, and IG) and each target interface (TX, TY, TZ, TQ) of the connectivity 200 (of FIG. 2) for the NoC of Table 100 (FIG. 1).

Figure 5:
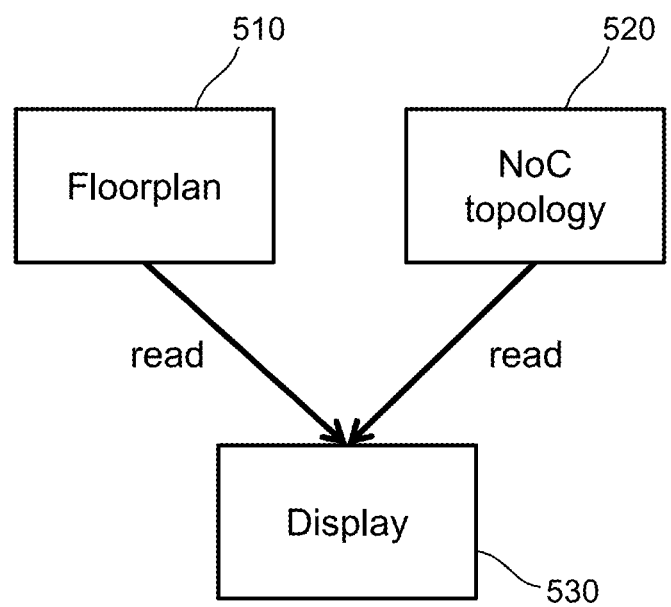
FIG. 5 illustrates a flowchart of displaying a NoC topology on a floorplan.

FIG. 5 shows a process according to some aspects and one embodiment of the invention. Floorplan data 510 is read and NoC topology 520 is read. The combined data is shown on a display 530 in two layers.

Figure 6:
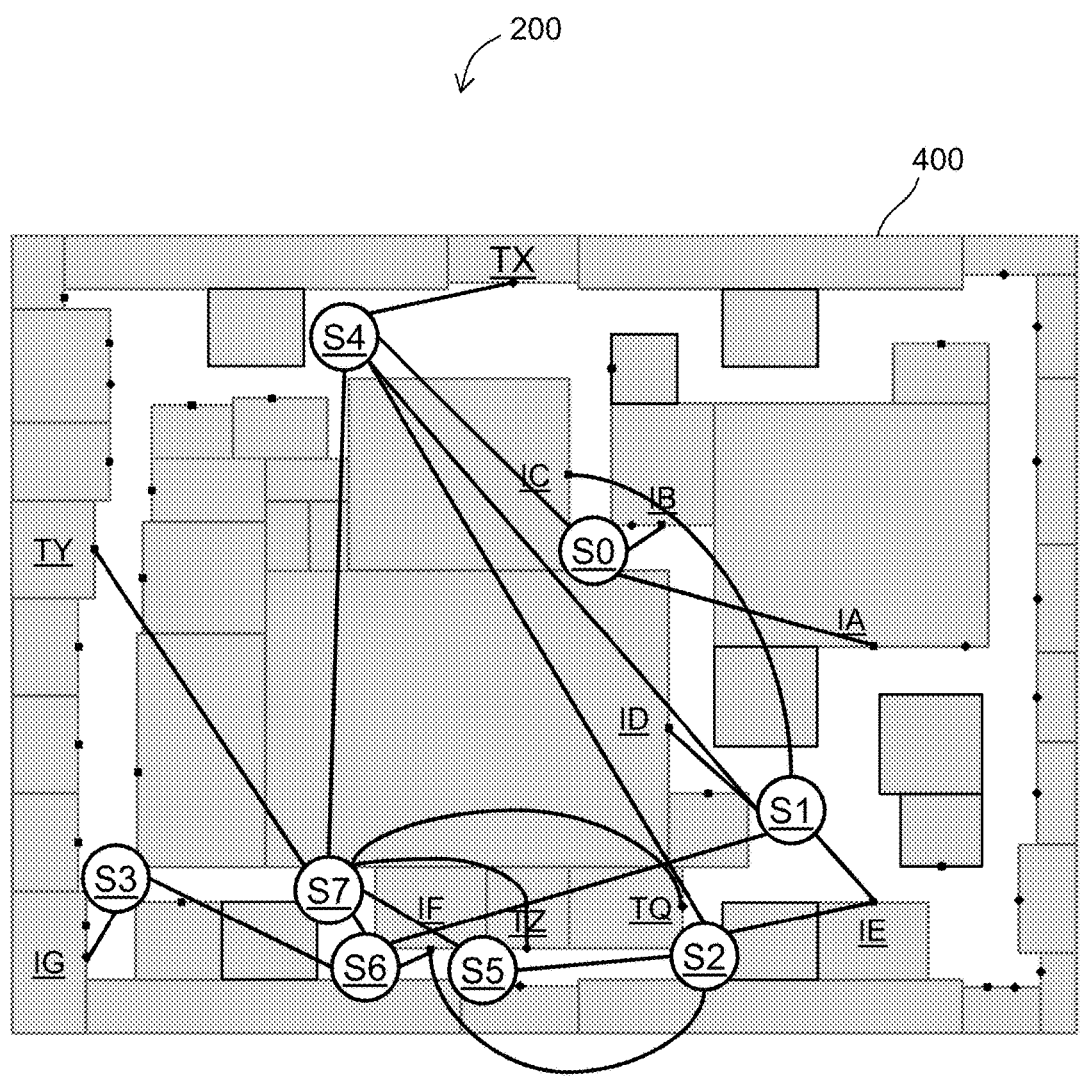
FIG. 6 illustrates a NoC topology displayed on top of a floorplan.

FIG. 6 shows a display of the topology diagram (FIG. 3) for the connectivity 200 of the NoC placed over the chip floorplan 400. All connections of endpoints and switches from FIG. 3 are shown. Connecting lines indicate the logical connectivity between elements, but not the physical routes for wires. Curvature of lines is merely for clarity. Each switch has a location. The initial location is computed using a heuristic algorithm that minimizes wire length and logic gate congestion. The center location of each switch is placed in a space that is not within any blockage.

Figure 7:
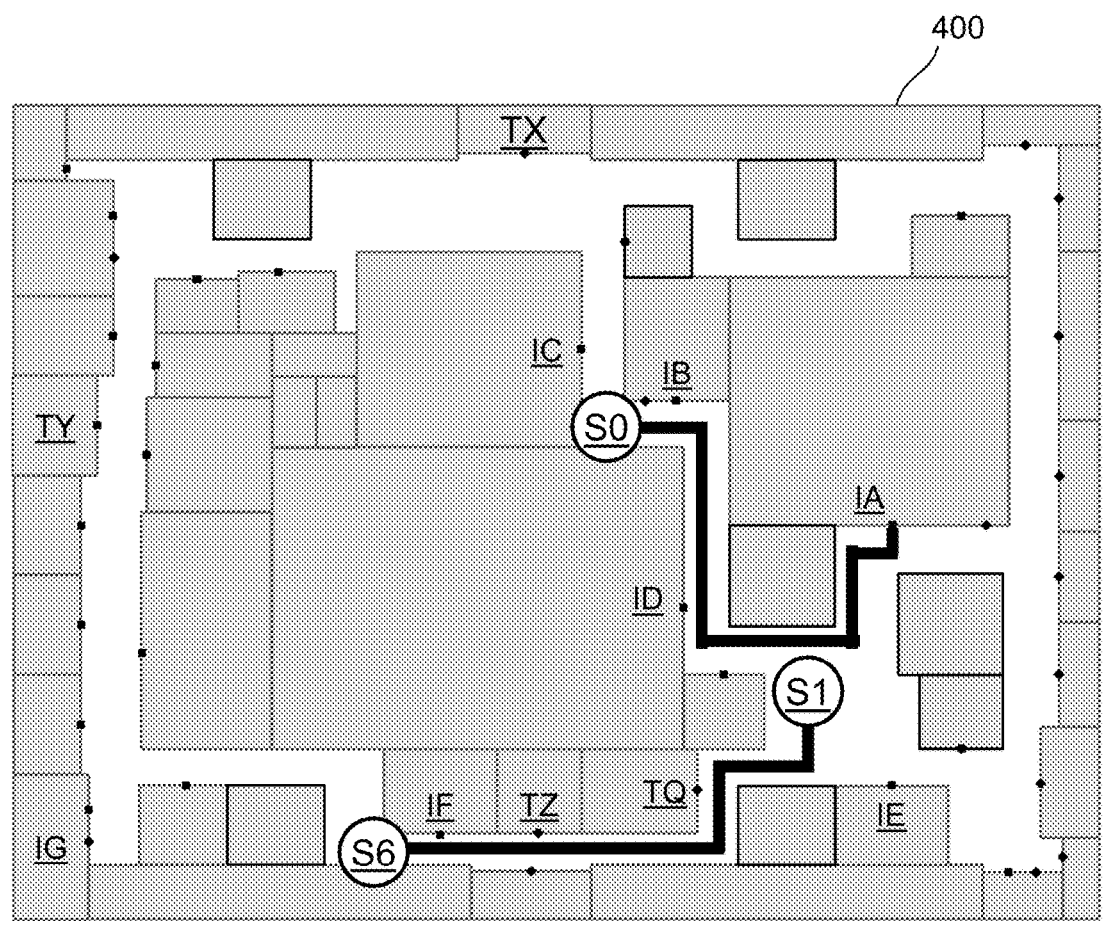
FIG. 7 illustrates some connections of a NoC topology represented with Manhattan routes.

According to various aspects and an embodiment of the invention, shown in FIG. 7, a filter can be applied to show only a selected set of switches and endpoints. Furthermore, a physical view mode shows connections between elements using calculated Manhattan routes. A user can drag and drop switches and endpoints and the Manhattan routing of the moved connections are immediately redrawn.

Figure 8:
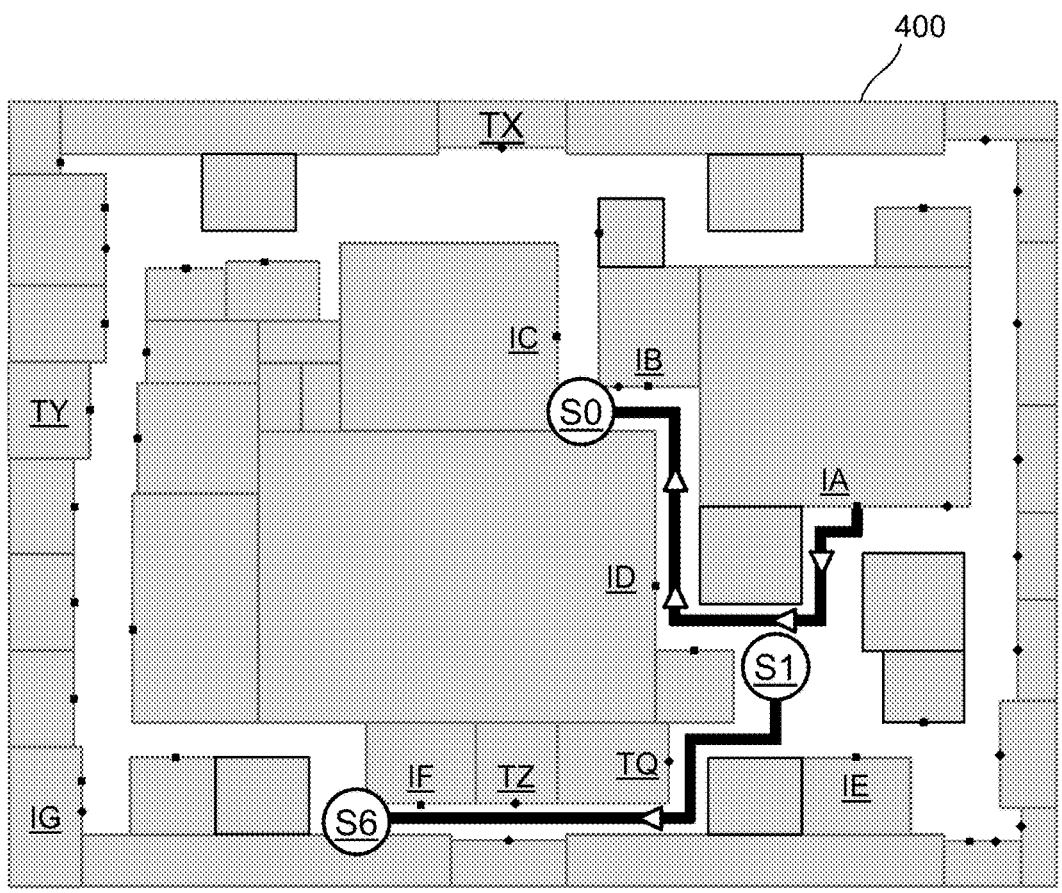
FIG. 8 illustrates some connections of a NoC topology with pipeline stages.

According to various aspects and an embodiment shown in FIG. 8, the approximate distance for wire routing between elements is computed. Each element has a clock period. Based on the clock period and distance over which signals must propagate, a required number of pipe stages are calculated. The pipe stages are shown in FIG. 8 as small triangles evenly spaced along routes between connected elements.

Figure 9:
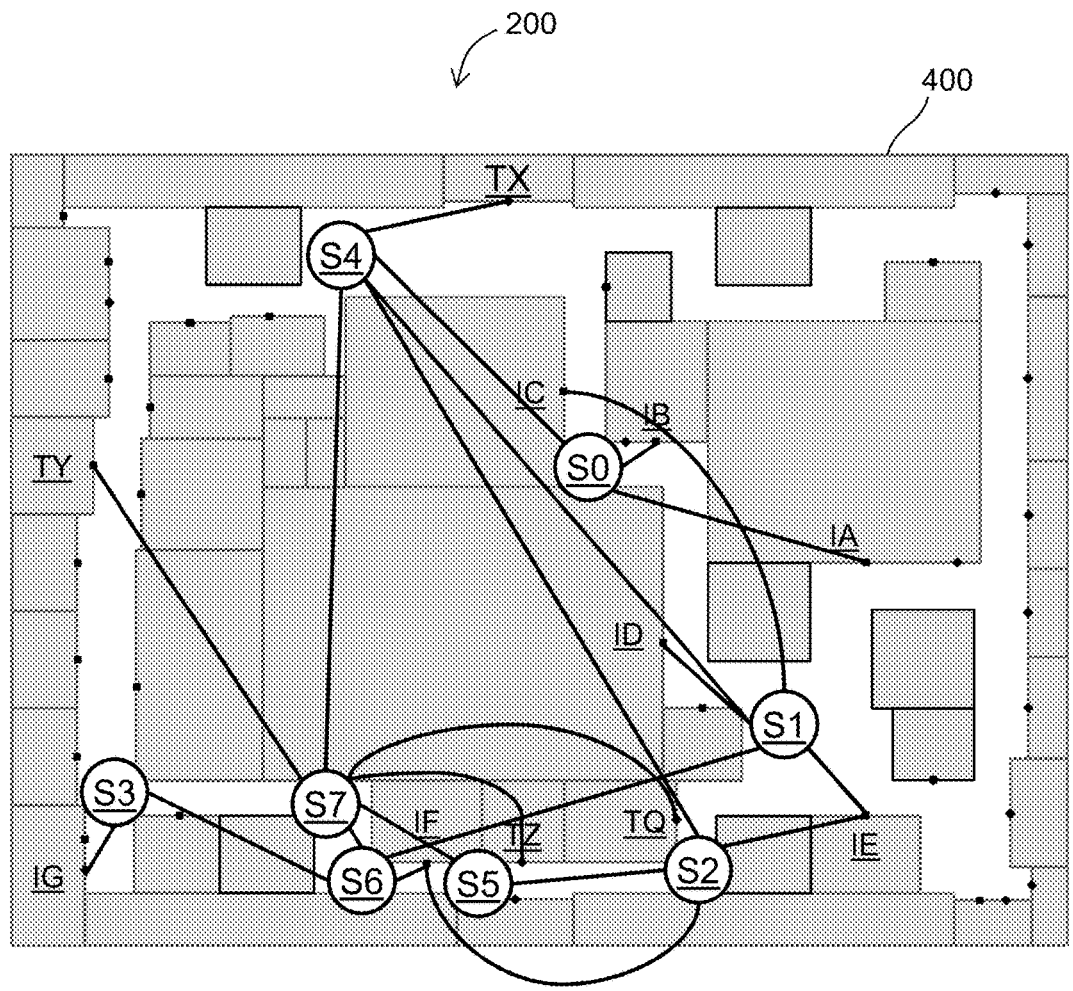
FIG. 9 illustrates a NoC topology over a floorplan with calculated statistics.

According to various aspects and an embodiment shown in FIG. 9, calculated statistics 900 are shown at the bottom of the display. Wire length is automatically calculated and updated each time that a switch or endpoint is moved within the floorplan. Total switch area and total NoC area are updated every time that the topology is changed or endpoints are reconfigured. Max path delay for all logic within a number of clock domains is calculated by a user command to compile a synthesis estimate. Statistics 900 show max path delay for two clock domains. Statistics 900 also provides a user option to overlay a wire density estimate as a layer above the floorplan.

FIG. 10 shows a data structure representing the connectivity between the initiator and target endpoints of the connectivity table 100. Each line in the data structure corresponds to a connection between an initiator endpoint and a target endpoint with logical connectivity.

FIG. 11 shows a data structure representing the topology diagram for the connectivity 200. Each line corresponds to a connection between an initiator and target. The names on the line show the initiator (I) at the beginning, the target (T) at the ends, and an ordered list of switches (S) in the middle. In accordance with various aspects of the invention, request traffic from initiator to target and response traffic from target to initiator traverses each switch in order. In accordance with some aspects of the invention, traffic between common elements may take different routes. For example, traffic from IC to TY and IC to TZ both passes through switches S1 and S7. However, between switches S1 and S7 traffic from IC to TY passes through switch S4 but traffic from IC to TZ passes through switch S6. Similarly, in accordance with various aspects of the invention, from initiator IE towards target TY passes through S1 and S4 before S7 whereas traffic from initiator IE towards target TZ passes through switches S2 and S5 before S7.

In accordance with various aspects of the invention, the embodiment of FIG. 11 indicates the routes of requests from initiators to targets. Another data structure instance can indicate routes of responses from targets to initiators. Embodiments with circular topologies would use alternate data structures to represent NoC topologies.

In accordance with various aspects of the invention, the embodiment of FIG. 11 is applicable to systems with a single static route between any pair of endpoints. Other aspects and embodiments of the invention may allow multiple routes between endpoints. Some embodiments with multiple routes may allow dynamic routing. Such embodiments require different data structures to represent topologies.

Figure 12:
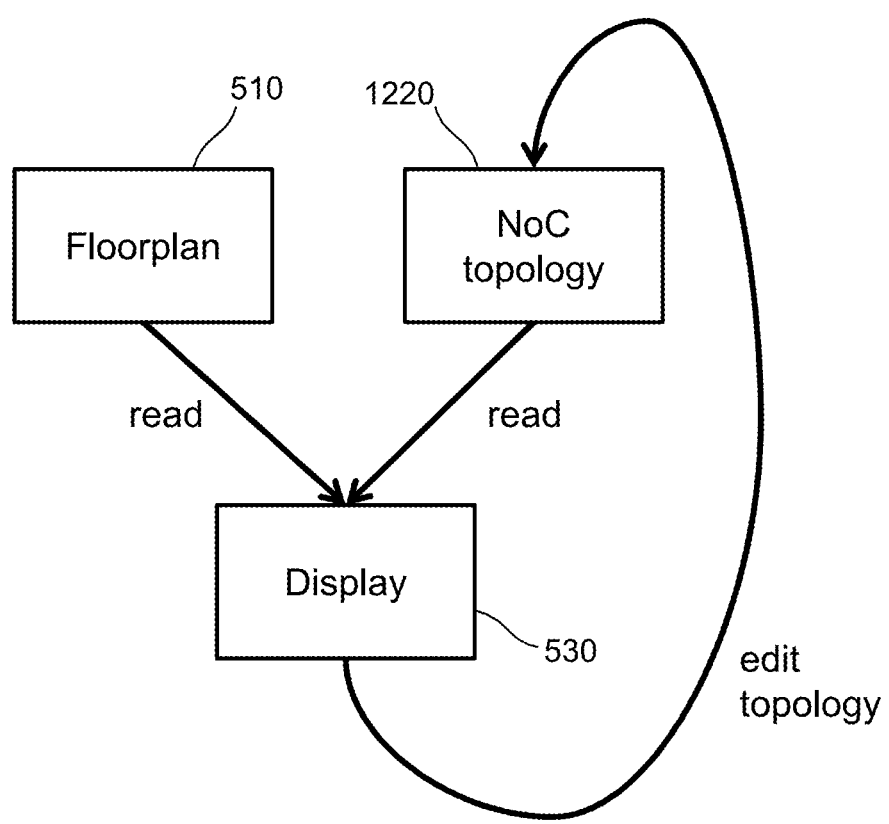
FIG. 12 illustrates a flowchart of editing a NoC topology over a floorplan.

FIG. 12 shows, in accordance with various aspects of the invention, a flow chart of editing a NoC topology. Floorplan 510 is read, along with NoC topology 1220 and shown on the display 530. A user edits the topology on the display, which causes an update to the NoC topology.

Figure 13:
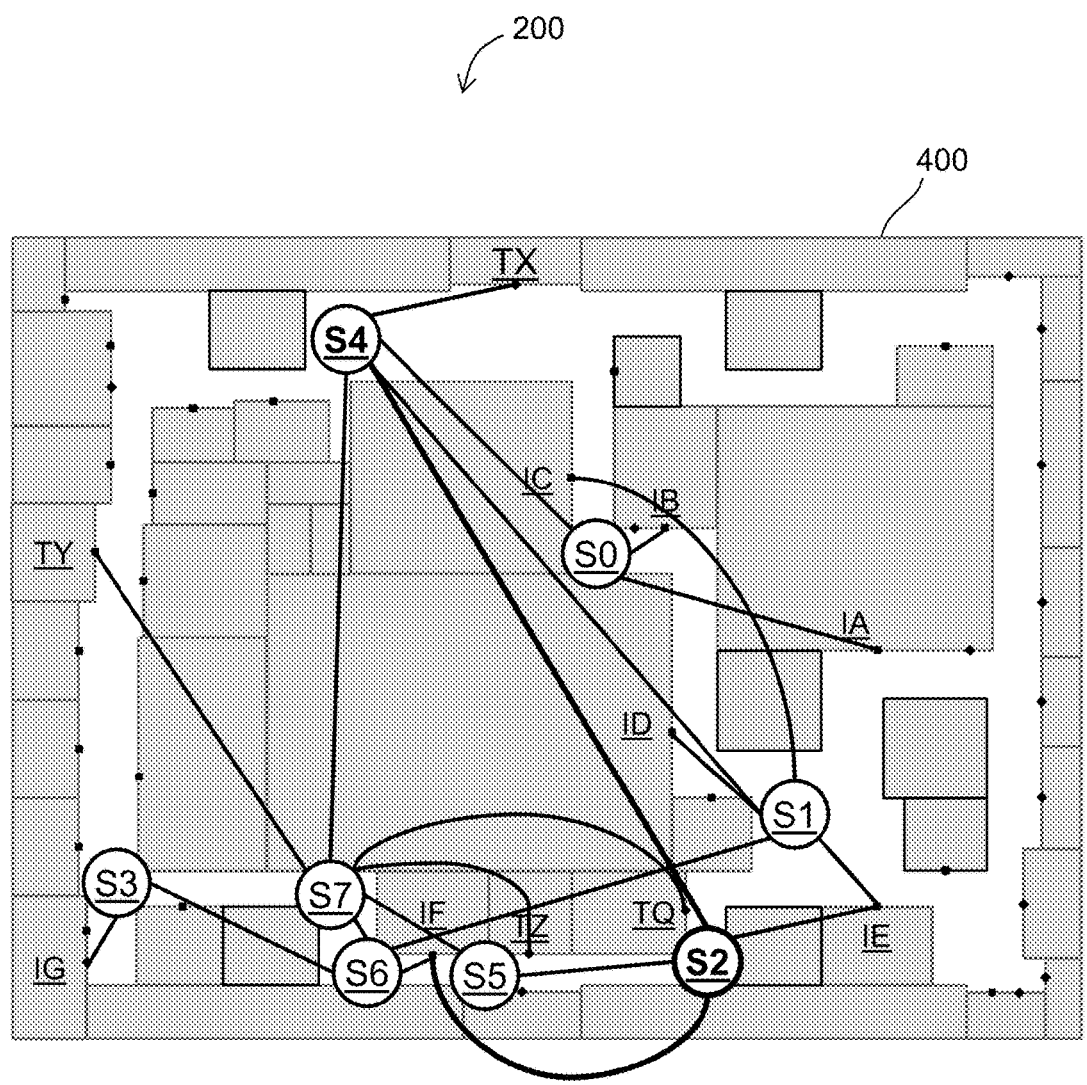
FIG. 13 illustrates a NoC topology over a floorplan with a highlighted route.
Figure 14:
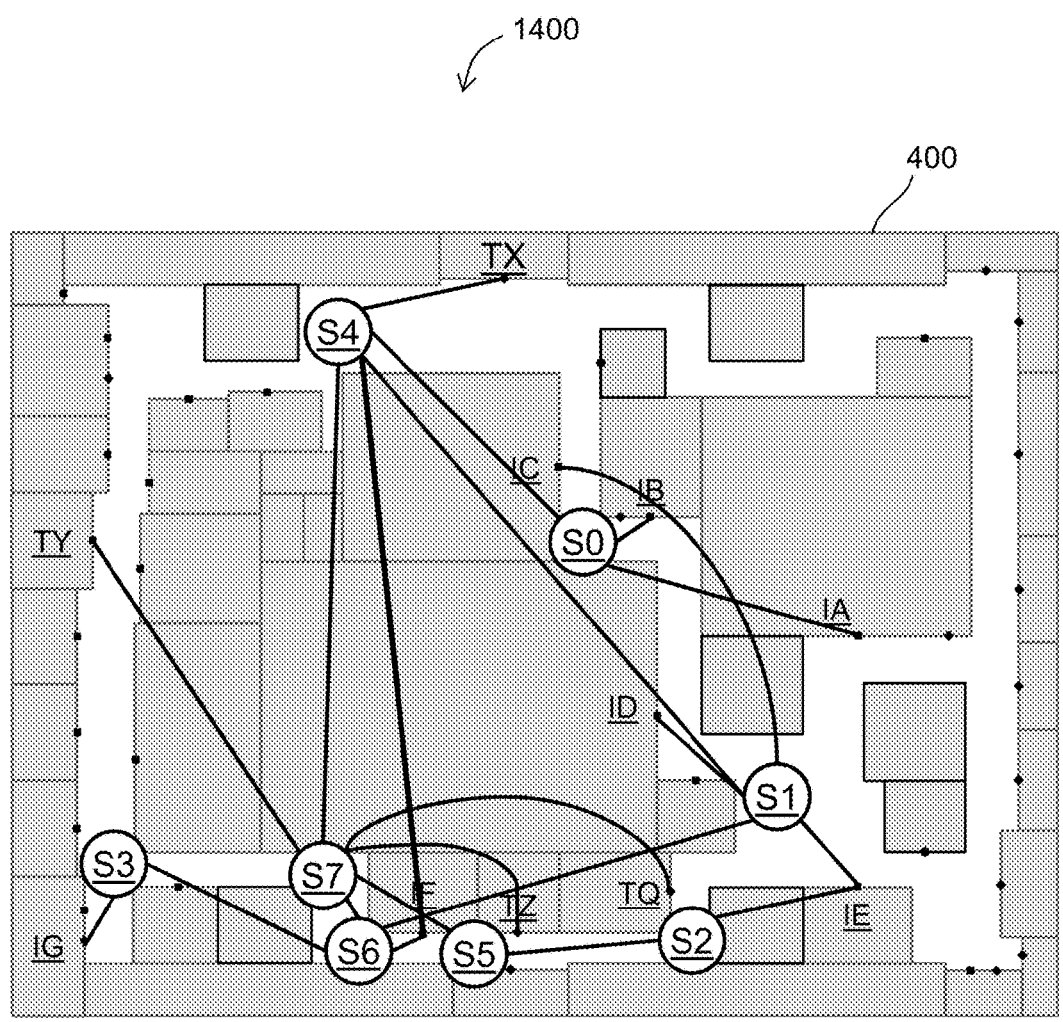
FIG. 14 illustrates a NoC topology over a floorplan, wherein the topology has been edited to remove a switch.

In accordance with various aspects of the invention and referring now to FIG. 13 and FIG. 14, FIG. 13 shows a first editing step. The segments from endpoint IF to switch S2 and the segment from switch S2 to switch S4 are selected. A command is performed to remove the route. This causes the two segments to be deleted. The result is a new NoC topology 1400 with a direct connection between endpoint IF and switch S4, as shown in FIG. 14.

Figure 15:
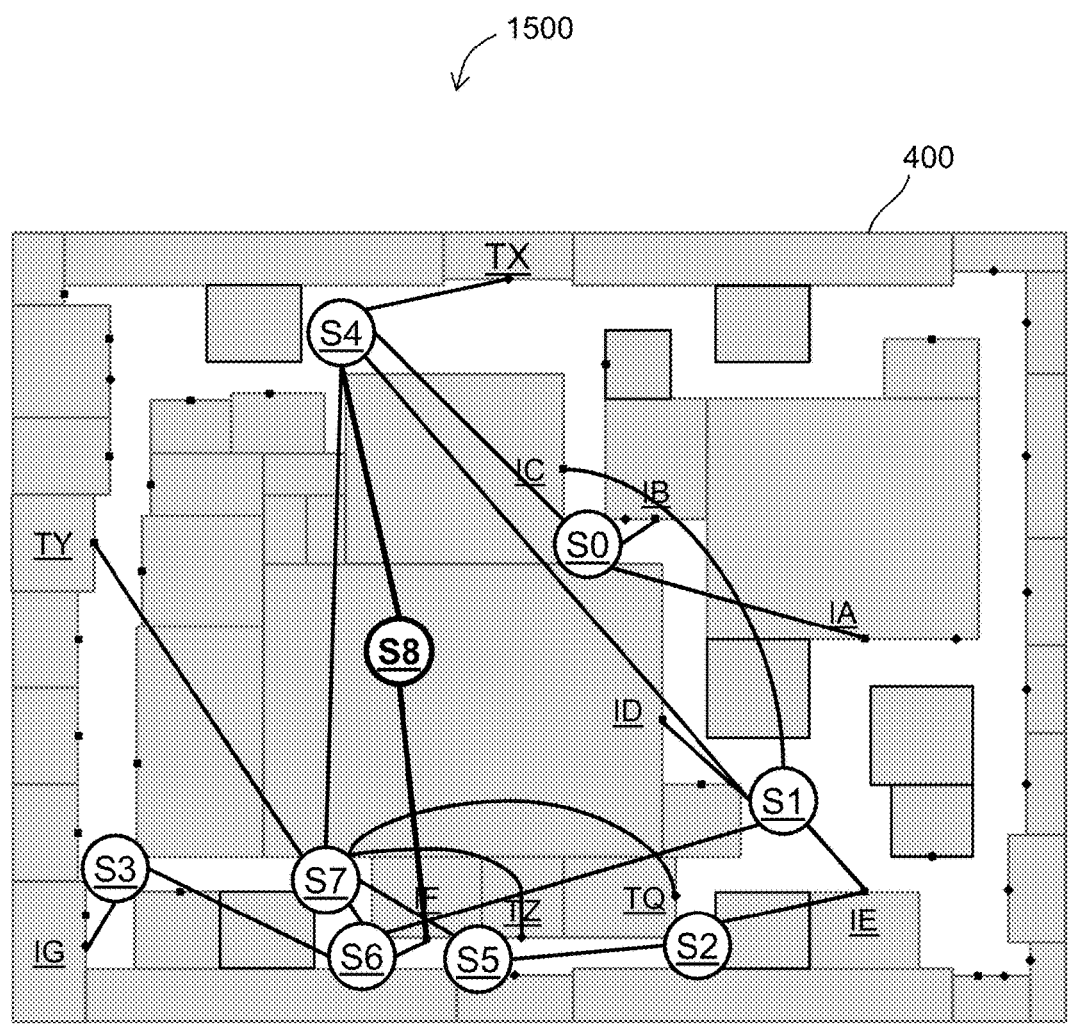
FIG. 15 illustrates a NoC topology over a floorplan, wherein a new switch has been added.

Referring now to FIG. 15 and In accordance with various aspects of the invention, in a further editing step, with the segment from IF to S4 selected, a command is performed to create a new switch. New NoC topology 1500 is created with switch S8 between IF and S4, as shown in FIG. 15.

Figure 16:
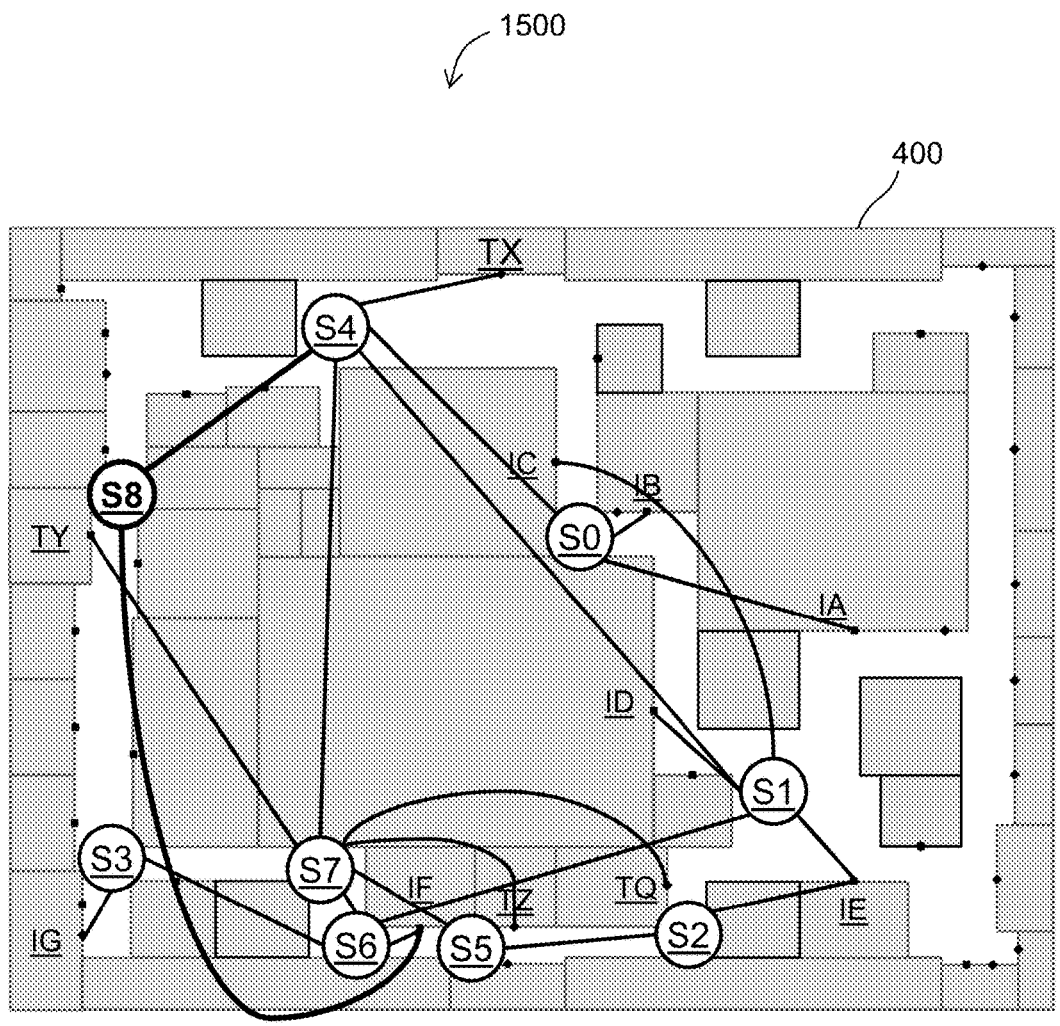
FIG. 16 illustrates a NoC topology over a floorplan, wherein a switch has been moved to a new location.

Referring now to FIG. 16, according to the aspects and embodiments of the invention, switches may not be located within obstructed areas of the floorplan. Therefore, the design must be adjusted to move S8 to an unobstructed area, as shown in FIG. 16. The topology is the same while the location of switch S8 is changed. In accordance with some aspects and embodiments, the location is automatically changed. In accordance with other aspects and other embodiments, a warning indication is shown to the user, indicating that the location of switch S8 must be changed. The user can, using a user input device (not shown), provide input that changes the location of switch S8 (or any other element) as desired.

Figure 17:
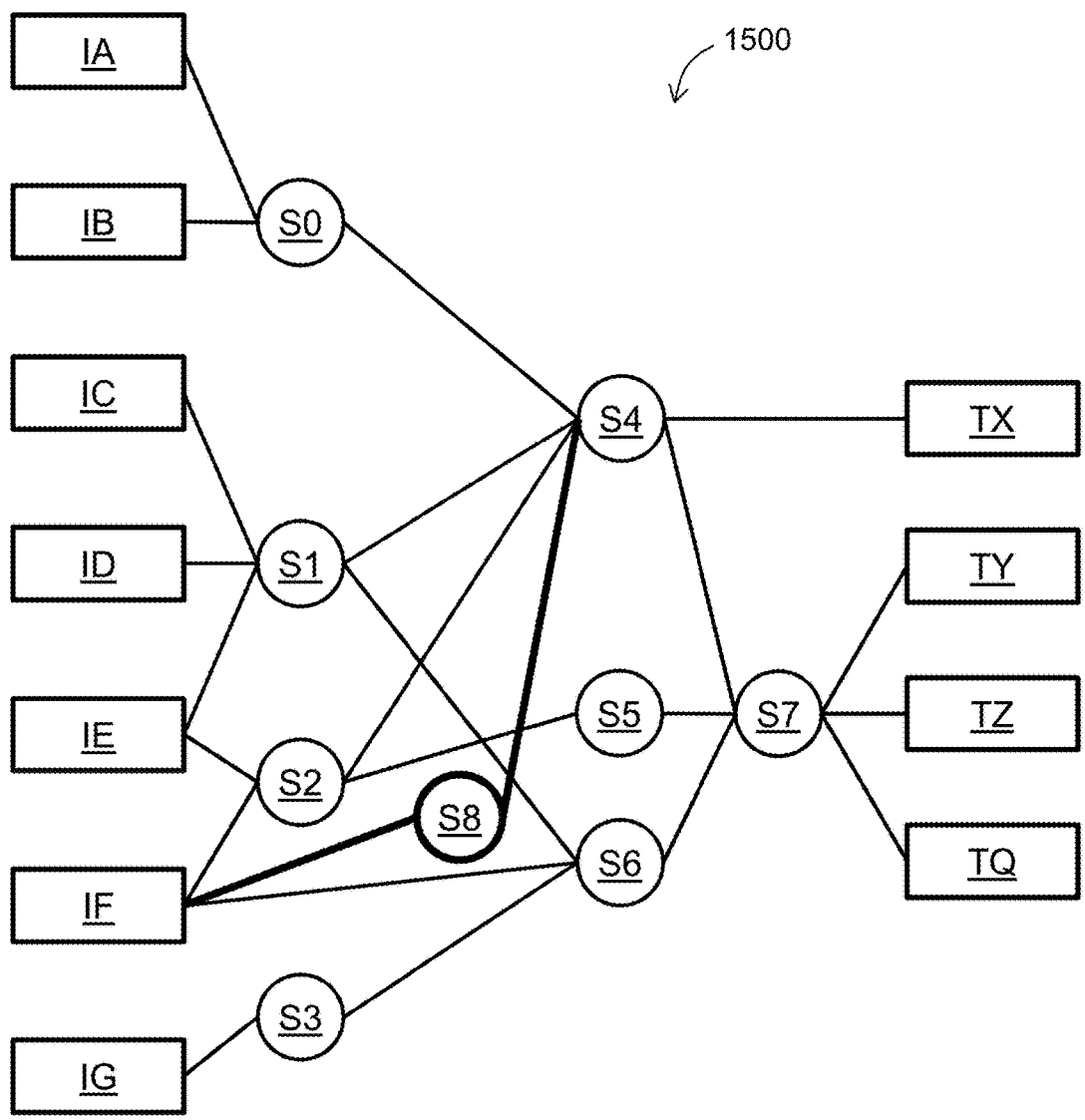
FIG. 17 illustrates a NoC topology, wherein a new switch has been added and connected.

FIG. 17 shows the location of switch S8 of topology 1500 of FIG. 15 diagrammatically without the floorplan.

FIG. 18 shows the new topology data structure with S8 between initiator endpoint IF and switch S4 on the route to target endpoint TX.

Figure 19:
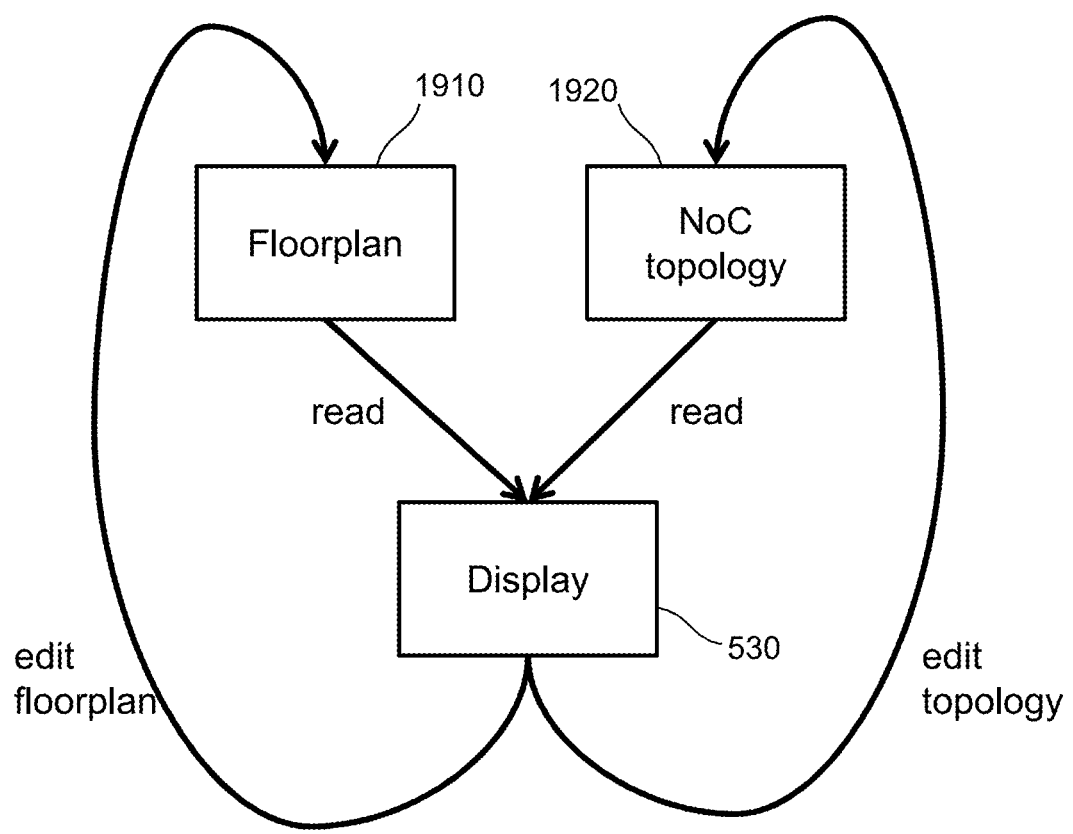
FIG. 19 illustrates a flowchart of editing a NoC topology over a floorplan and editing the floorplan.

FIG. 19 shows a flowchart of editing the NoC topology and floorplan. Floorplan 1910 data structure is read along with a NoC topology 1920 data structure and shown on the display 530. A topology edit is performed, causing an update to the data structure of the NoC topology 1920, which is read and shown on the display 530. A floorplan edit is performed, causing an update to the data structure of the floorplan 1910, which is read and shown on the display 530.

Figure 20:
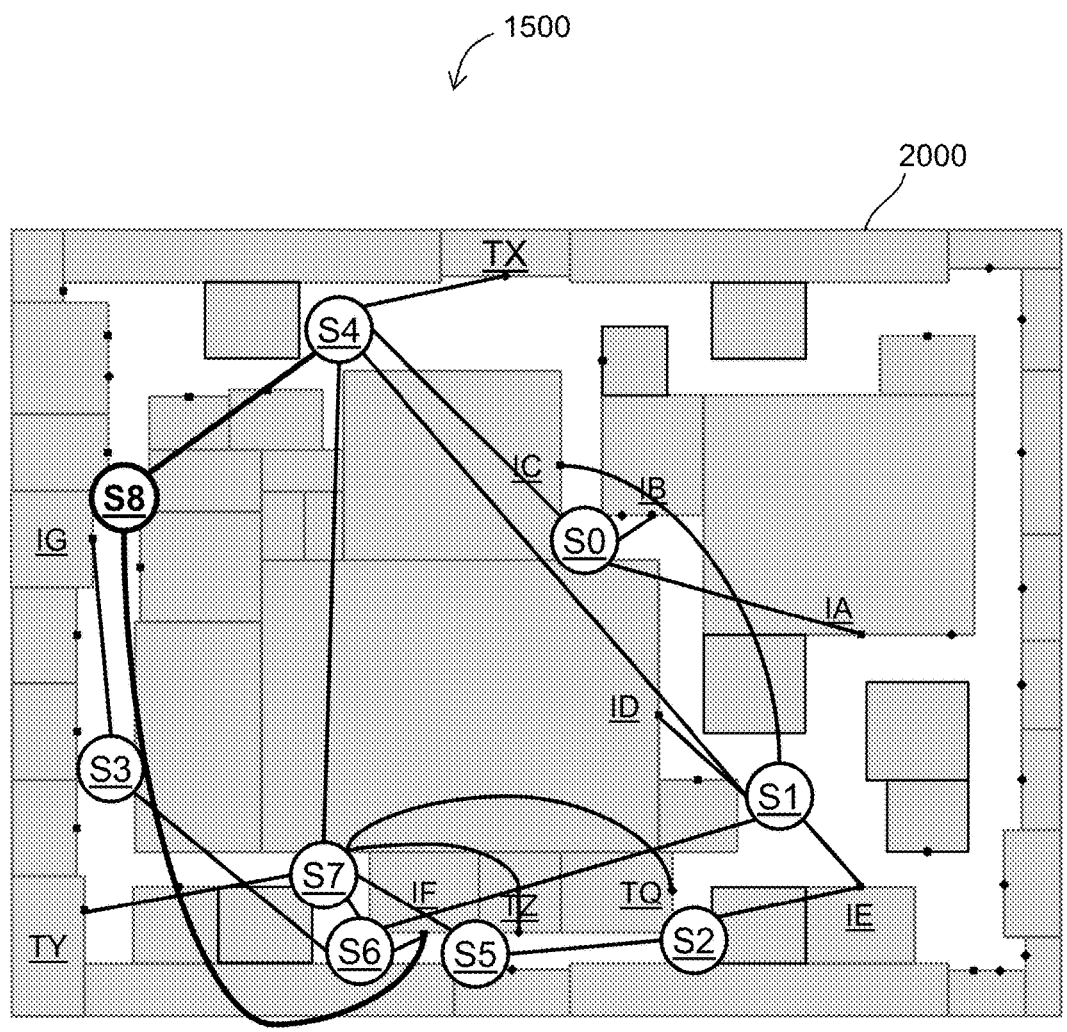
FIG. 20 illustrates a NoC topology over a floorplan, wherein the floorplan has been edited to change the location of an initiator and a target.

FIG. 20 shows the result of a floorplan edit. The floorplan 400 of FIG. 16 is edited to switch the locations of endpoints TY and IG. The result is a floorplan 2000. The locations of connected switches are recalculated. Therefore, switch S3 changes location such that it is closer to the new location of endpoint IG.

Figure 21:
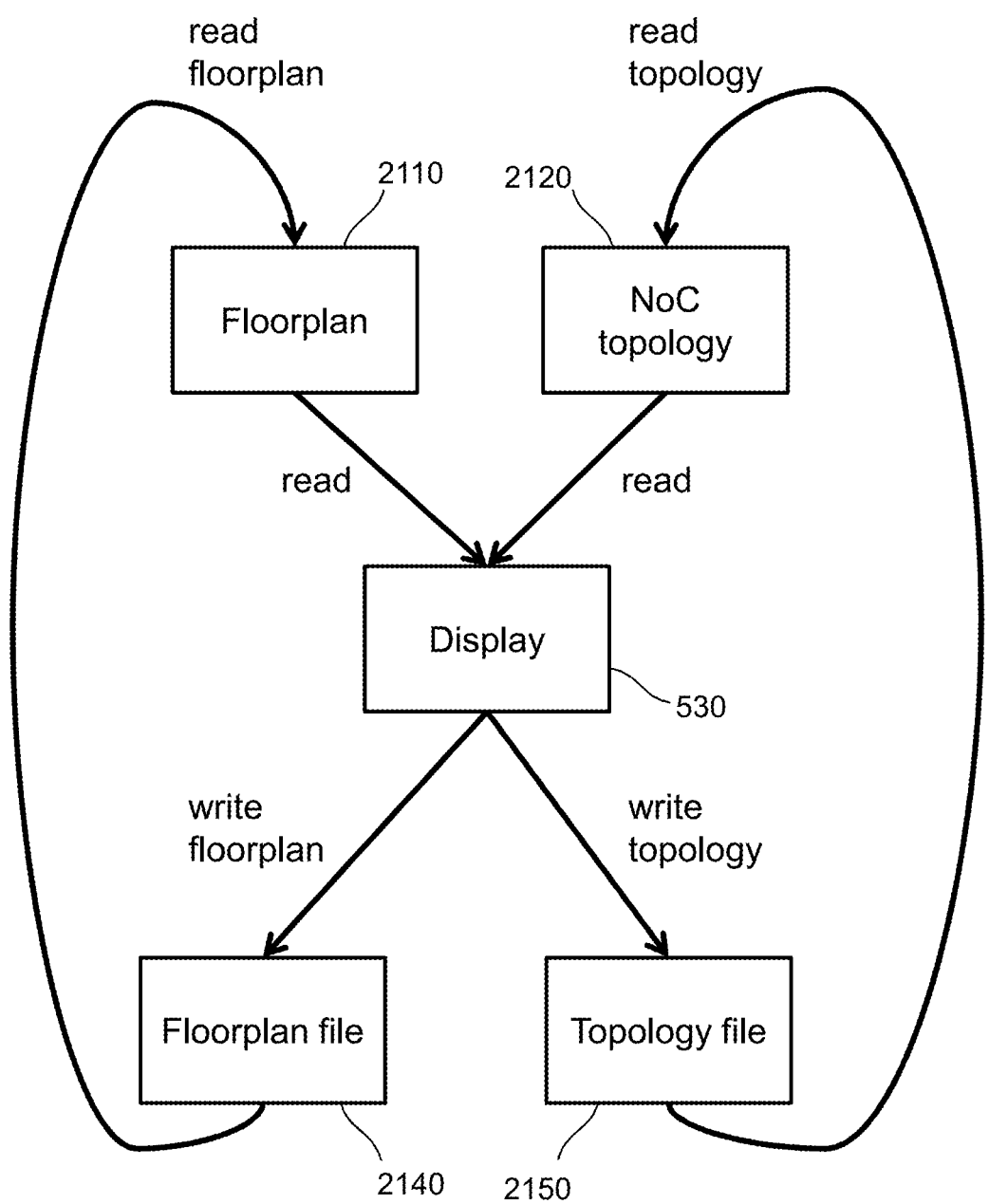
FIG. 21 illustrates a flowchart of reentrant editing of a NoC topology and floorplan.

FIG. 21 shows a flowchart according to some aspects and an embodiment of the invention. A floorplan 2110 and a NoC topology 2120 are read and shown on the display 530. A user performs a save operation, which causes two files to be written to a non-transient computer readable storage medium: floorplan file 2140 and topology file 2150. Next, a file open command is performed, which causes the floorplan 2110 data structure to be read from the floorplan file 2140 and the NoC topology 2120 data structure to be read from the topology file 2150. In other aspects and embodiments of the invention, floorplan data and topology data are stored in the same file.

Embodiments of the invention are often used in preparation for the synthesis, P&R steps of a chip design flow. The locations of NoC elements, as calculated and/or specified by a user, are valuable information to guide the P&R tools to achieve better results.

Figure 22:
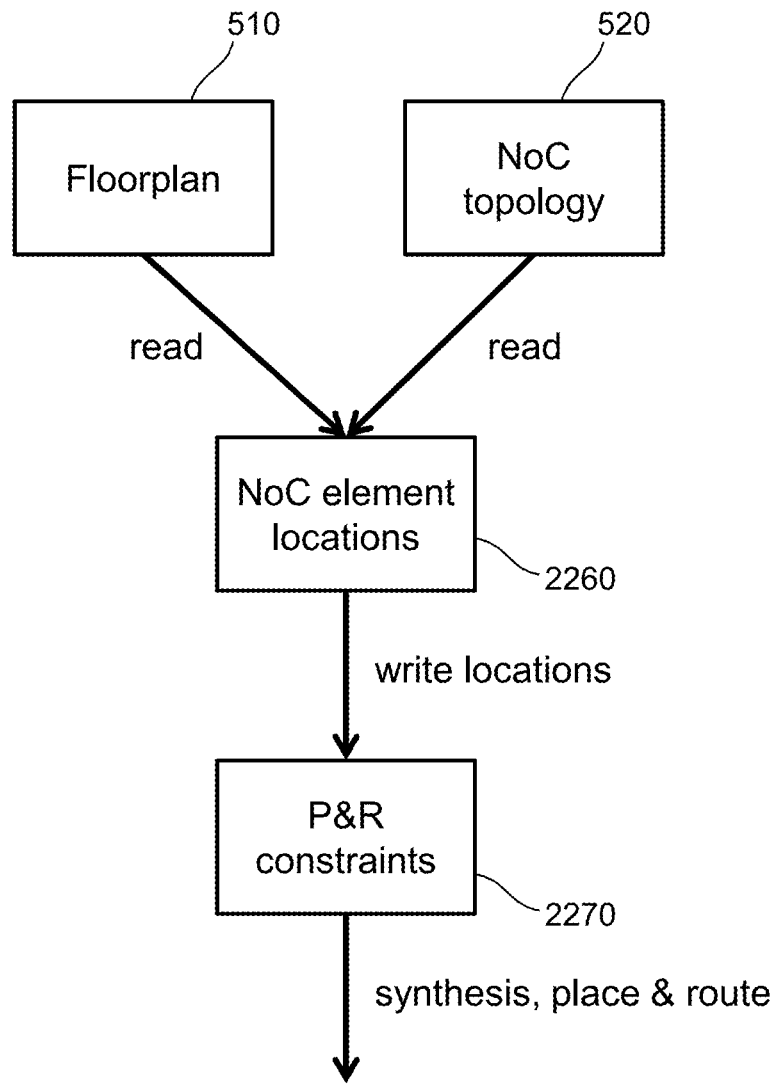
FIG. 22 illustrates a flowchart of generating synthesis, place & route constraints from a NoC topology and floorplan.

FIG. 22 shows a flowchart of such a flow. Floorplan 510 data and NoC topology 520 data are read. NoC element locations 2260 are determined from the data structures. P&R constraints 2270 are written based on NoC element locations 2260. The P&R constraints are in an appropriate format and are later used by synthesis, P&R tools.

Physical machines, such as semiconductor chips, hardware description language representations of the logical or functional behavior of machines according to the invention described and claimed, and one or more non-transitory computer readable media arranged to store such hardware description language representations all can embody machines described and claimed herein.

Some aspects and embodiments of physical machines described and claimed herein are programmable in numerous variables, combinations of which provide essentially an infinite variety of operating behaviors. Some aspects and embodiments of hardware description language representations described and claimed herein are configured by software tools that provide numerous parameters, combinations of which provide for essentially an infinite variety of physical machine embodiments of the invention described and claimed. Methods of using such software tools to configure hardware description language representations embody the aspects and embodiments of the invention described and claimed.

The behavior of either or a combination of humans and machines; instructions that, if executed by one or more computers, would cause the one or more computers to perform methods according to the invention described and claimed; and one or more non-transitory computer readable media arranged to store such instructions embody methods and systems described and claimed herein. Each of more than one non-transitory computer readable medium needed to practice the invention described and claimed herein alone embodies the various aspects of the invention.

Elements described herein as coupled have an effectual relationship realizable by a direct connection or indirect connection with one or more other intervening elements.

Unless defined otherwise, all technical and scientific terms used herein have the same meaning as commonly understood by one of ordinary skill in the art to which this invention belongs. The verb "couple", its gerundial forms, and other variants, should be understood to refer to either direct connections or operative manners of interaction between elements of the invention through one or more intermediating elements, whether or not any such intermediating element is recited.

Any methods and materials similar or equivalent to those described herein are not considered abstract ideas and are considered to be significant improvements in the art when used in the practice of the invention. Representative illustrative methods and materials are also described. Additionally, it is intended that equivalents include both currently known equivalents and equivalents developed in the future, i.e., any elements developed that perform the same function, regardless of structure. The scope of the invention, therefore, is not intended to be limited to the exemplary aspects and embodiments shown and described herein.

In accordance with the various aspects of the invention, a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device, including displays and input devices) includes a non-transitory computer readable medium or storage/memory that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computer or computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects and embodiments, the creation or amendment of the computer-aided design is implemented as a web-based software application, in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements that, although not explicitly described or shown herein, embody the principles of the invention and are included within its spirit and scope. Furthermore, all examples and conditional language recited herein are principally intended to aid the reader in understanding the aspects and principles of the invention and the concepts contributed by the inventors to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention is not intended to be limited to the various aspects and embodiments discussed and described herein. Rather, the scope and spirit of invention are embodied in the appended claims.

What is claimed is:

1. A method comprising:
   determining connectivity between targets and initiators of a Network-on-Chip (NoC) to represent a NoC topology, including a plurality of routes, in a graphic view through a graphical user interface;
   representing the NoC topology on top of a physical view of a chip's floorplan to include in the graphic view the NoC topology and the chip's floorplan;
   editing the graphical representation of the NoC by altering a route, as shown in the graphical user interface, to automatically change the route, which includes creating or deleting at least one element, that a packet takes from source to destination to create an edited NoC topology; and
   providing immediate feedback to a designer regarding the consequence of editing the NoC topology on performance and the ability to implement the edited NoC topology.

2. The method of claim 1 further comprising adding a new switch to the NoC topology on top of the physical view.

3. The method of claim 1 further comprising adding an element to at least one route within the NoC topology.

4. The method of claim 1 further comprising removing an element from at least one route within the NoC topology.

5. The method of claim 1 further comprising changing the order of NoC elements on at least one route within the NoC topology.

6. The method of claim 1 further comprising editing a physical location of at least one element of the NoC topology.

7. The method of claim 1 further comprising automatically suggesting the physical location of at least one NoC topology element.

8. The method of claim 1 further comprising exporting a script for place and route (P&R) to constrain the physical location of at least one NoC element.

9. The method of claim 1, wherein the physical view includes:
   blockages on the chip's floorplan; and
   lines that indicate connections between a plurality of NoC elements within the NoC topology.

10. The method of claim 9 wherein the lines follow Manhattan routes arranged such that no line crosses a blockage.

11. The method of claim 1 wherein the editing is reentrant.

12. The method of claim 1 further comprising calculating wire length.

13. The method of claim 1 further comprising estimating area.

14. The method of claim 1 further comprising representing wire density.

15. The method of claim 1 further comprising calculating timing, based on distance between a multiplicity of NoC elements.

16. The method of claim 1 further comprising computing maximum bandwidth between at least two NoC elements.

17. The method of claim 1 further comprising estimating latency of a transaction at an initiator endpoint.

18. A method of using at least one non-transitory computer readable medium having code that, when executed by at least one processor, would cause the at least one processor to:
   determine connectivity between elements of a Network-on-Chip (NoC) to represent a NoC topology in a graphic view through a graphical user interface, the elements being connected by a plurality of lines;
   display, on the graphical user interface, a physical floorplan and, simultaneously display, on the graphical user interface, the NoC topology on top of the physical floorplan;
   accept user commands including altering a set of routes, which is shown in the graphical user interface, to automatically change the route, which includes creating or deleting at least one element, that a packet takes from source to destination resulting in a change to the NoC topology to produce an edited NoC topology; and
   provide immediate feedback to the user regarding consequences of editing the NoC topology on performance and the ability to implement the edited NoC topology.

19. The method of claim 18 wherein the user commands further includes editing a physical location of at least one element of the NoC topology based on at least one accepted user command.

20. A system comprising:
   a processor;
   a user input device;
   memory; and
   a display, wherein the memory includes code that is executed by the processor to cause the system to:

display a chip's physical floorplan on the display, wherein the physical floorplan includes blockage areas;

determine connectivity between elements of a Network-on-Chip (NoC) to represent a NoC topology in a graphic view on the display, the elements being connected by a plurality of lines that are to be located on the chip's physical floorplan;

show the NoC topology for the chip on top of the physical floorplan on the display;

accept, through the user input device, user commands including altering at least one route and at least one switch that is part of the route, which is shown in the graphical user interface, to automatically change the route, which includes creating or deleting at least one element, that a packet takes from source to destination resulting in a change to the NoC topology to produce an edited NoC topology; and redisplay, on the display, the edited NoC topology on top of the chip's physical floorplan thereby providing immediate feedback to the user regarding at least one of the edited NoC topology performance and the ability to implement the edited NoC topology.

* * * * *